March 21, 1961 G. L. RICHARDS 2,976,431
BLOCKING OSCILLATOR CONTROLLED TWO-TRANSISTOR BILATERAL SWITCH
Filed June 22, 1959
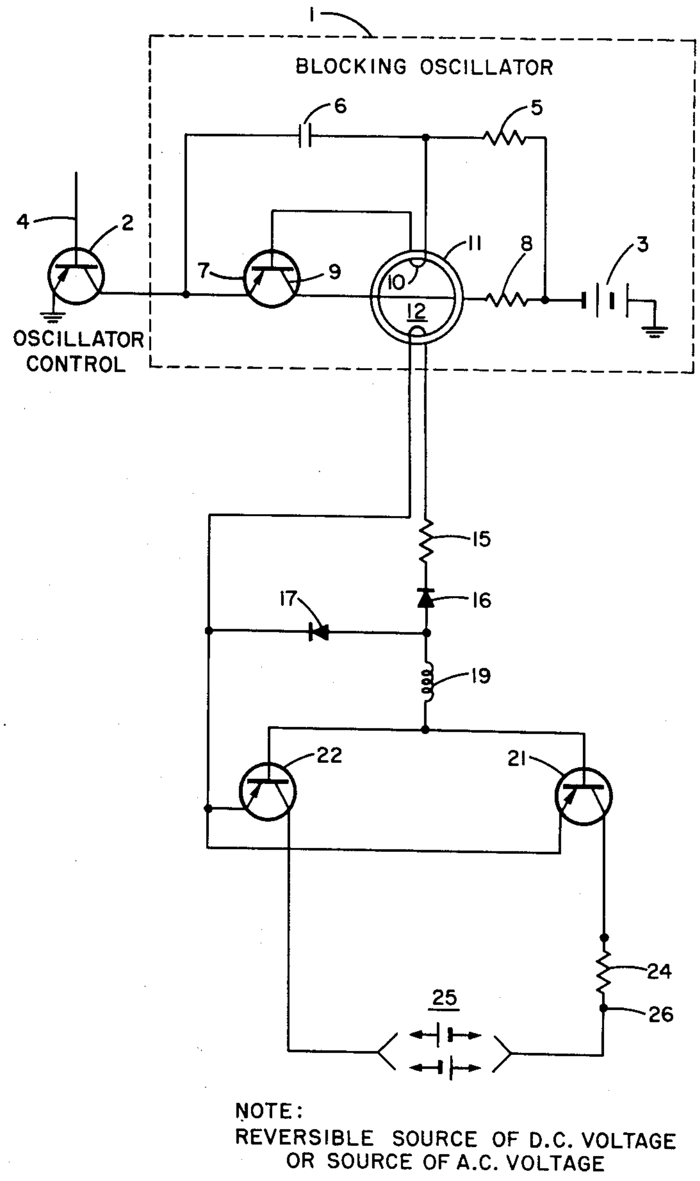
INVENTOR.
GLENN L. RICHARDS
BY
[signature]
ATTORNEY United States Patent Office 2,976,431

Patented Mar. 21, 1961

2,976,431

BLOCKING OSCILLATOR CONTROLLED TWO-TRANSISTOR BILATERAL SWITCH

Glenn L. Richards, Rochester, N.Y., assignor to General Dynamics Corporation, Rochester, N.Y., a corporation of Delaware Filed June 22, 1959, Ser. No. 821,993

1 Claim. (Cl. 307—88.5)

The present invention relates to solid state relay circuits.

The circuit described herein is an improvement over the electronic switching circuit which is the subject of Patent No. 2,866,909 assigned to the assignee of the present invention.

It is an object of the present invention to provide an improved solid state relay circuit which is simple and inexpensive.

It is a further object of the present invention to provide an improved solid state relay circuit in which a controlling circuit is isolated from a controlled circuit, the latter including a load device to be operated upon the application of a signal to the controlling circuit, in the manner of a mechanical relay.

It is a further object of the present invention to provide an arrangement of a pair of low power transistors, a load device and a reversible D.C. voltage source, for causing equal operating current to flow through the load device upon the application of a control signal to the base electrodes of the transistors, regardless of the polarity of the D.C. voltage source in the circuit at the time of the application of the control signal.

Yet a further object of the present invention is to provide a novel constant current D.C. source which does not waste power and which supplies current to the control electrodes of a pair of transistor switches thereby causing operating current to flow through a load device coupled to the transistors.

A still further object of the present invention is to provide a bilateral switch which includes two transistors, and which is controlled by a low voltage D.C. source and may pass a signal having high voltage swings.

A feature of the present invention is the provision of a bilateral switch comprising a pair of low power transistors having the emitter-collector circuit of one connected in series with the emitter-collector circuit of the other; each circuit connected in series with a load device and a reversible source of relatively large D.C. operating potential, so that upon the application of a relatively small control potential to the control electrodes of the transistors, the same amount of current flows through the load device regardless of the polarity of the reversible D.C. source.

A further feature of the present invention is the provision of a controlled blocking oscillator having a high duty ratio and producing an A.C. output signal which is fed through a rectifier and a novel constant current filter to the control electrodes of a pair of switching transistors, to thereby cause a nonpulsating D.C. current to flow through the control electrodes upon the activation of the blocking oscillator.

Further obects and advantages of the present invention will become apparent as the following description proceeds and the features of novelty which characterize the invention will be pointed out with particularity in the claim annexed to and forming a part of this specification.

For a better understanding of the invention, reference may be had to the accompanying drawing of which the figure discloses a preferred embodiment of the invention.

Referring now to the figure of the accompanying drawing, blocking oscillator 1 is disclosed in conjunction with PNP transistor 2 which controls its operation. Negative potential is applied to base electrode 4 of control transistor 2, causing the emitter-collector impedance of this transistor to become sharply reduced. This action results in the flow of a charging current from ground through the emitter-collector circuit of transistor 2, capacitor 6 and resistor 5 to voltage source 3. Shortly after the initiation of this current flow the base electrode of PNP transistor 7 becomes negative with respect to the emitter and current commences to flow through the emitter-collector circuit of transistor 7. The resulting change of flux in core 11 causes a feedback voltage to be produced across winding 10 of transformer 12 which discharges and recharges capacitor 6 in a reverse direction so that the upper plate of this capacitor becomes positive with respect to the lower plate. During the recharging process of capacitor 6, the base of transistor 7 remains negative with respect to the emitter and emitter-collector current continues to flow. After the capacitor 6 becomes recharged, the base of transistor 7 is no longer negative with respect to the emitter and current flow through the emitter-collector circuit ceases. The resulting change of flux in core 11 in the opposite direction causes a voltage to be produced across winding 10 which in conjunction with the voltage existing across capacitor 6, holds transistor 7 in a state of nonconduciton. Shortly thereafter the rate of change of flux within the core becomes equal to zero and the voltage produced across winding 10 is also reduced to zero. Transistor 7 remains in a state of nonconduction and capacitor 6 discharges and recharges through the emitter-collector circuit of transistor 2, voltage source 3 and resistor 5 so that its upper plate again becomes negative with respect to its lower plate and transistor 7 becomes biased to conduction to thereby repeat the cycle. Transistor 7 may be a 2N369 type or equivalent capable of displaying a considerable storage effect which results in the continuation of current flow between the emitter and collector for a fixed time interval after the application of positive cut-off voltage to the base electrode of transistor 7. The result is to increase the duty ratio of the blocking oscillator, since the amount of time in each cycle that the transistor 7 remains cut off is reduced thereby. The reason for increasing the duty ratio is set forth hereinafter. Blocking oscillator 1 continues to generate a train of A.C. pulses as long as a negative potential is present on base electrode 4 of control transistor 2.

The alternating current output wave of blocking oscillator 1 is rectified by diode 16 and converted into nonpulsating direct current by the constant current filter which is claimed in application Serial No. 821,995, filed June 22, 1959, and assigned to the same assignee as the present invention, and which comprises smoothing choke 19 and diode 17. The output winding of transformer 12 is wound about core 11 so that during the major portion of each cycle of blocking oscillator 1, the cathode of diode 16 is negative with respect to the anode and current flows through the emitter base circuits of transistors 21 and 22, smoothing choke 19, diode 16 and resistor 15. For a short interval during each cycle the cathode of diode 16 is driven positive with respect to the anode and diode 16 becomes back-biased so that current flow through the diode ceases. The result is that the magnetic field built up by the afore-mentioned current flow through choke 19 collapses and the voltage produced thereby forward-biases diode 17 which was back-biased during th einterval when diode 16 was forward-biased. As a result current flows through the emitter base circuits of the transistors and through diode 17 and the over-all result is a steady current flow through the emitter base circuit of transistors 21 and 22 during the time that blocking oscillator 1 is operating.

By utilizing a blocking oscillator having a high duty ratio in combination wth choke 19, a source of steady current is applied to the base electrodes of transistors 21 and 22 to operate them. This, of course, stems from the fly-wheel effect of choke 19. By increasing the duty ratio of the blocking oscillator, a reduction in the peak current flow through the emitter-collector circuit of transistor 7 may be had since the energy transferred to the choke by the blocking oscillator will remain the same. This results in utilization of a less expensive transistor 7 in blocking oscillator 1.

Of course, it should be understood that any kind of oscillator having a high duty ratio may be utilized in the place of blocking oscillator 1. An oscillator with a low duty ratio could also be utilized but proper operation of the circuit would require an increase in the inductance of the choke 19 which is undesirable from a cost standpoint. Also the switching speed would be reduced if a low duty ratio oscillator was used.

The emitter and collector circuits of transistors 21 and 22 are both connected in series with a load device represented by resistor 24 and a reversible source of direct current 25 as shown in the figure. When no output current is produced by the rectifier and the constant current filter, only a small leakage current flows through load resistor 24 since the aggregate impedance of the emitter-collector circuits of transistors 21 and 22 is high. The application of a small negative control voltage to base electrode 4 of control transistor 2 causes a D.C. current to flow through the emitter and base circuits of transistors 21 and 22 as previously explained, which in turn causes the aggregate impedance of the emitter-collector circuits of the transistors in the load circuit to sharply decrease to thereby actuate the load device. The amount of actuating current passing through the load device will be the same regardless of the reversible source of D.C. voltage 25.

Assuming that the negative terminal of the reversible source of D.C. voltage 25 is connected to terminal 26 of resistor 24 and assuming that the oscillator is inactive, a small leakage current will flow from the collector of transistor 22 which now acts as an emitter, through the base electrode of this transistor, through the base collector junction of transistor 21 and through the load device. This current will remain small because the base collector junction of transistor 21 is back-biased, and the load device will not be operated. Any increase in this leakage current will cause the base of transistor 22 to become more negative with respect to the collector which is operating as an emitter, to tend to decrease the emitter-collector impedance of transistor 22, to increase current flowing through the load device. However, this increase in leakage current causes the base of transistor 21 to become more positive with respect to the emitter and thus transistor 21 will be cut off so that the load device cannot become actuated in spite of any decrease in the emitter-collector impedance of transistor 22. Another reason why load device actuating current cannot flow is that diode 17 prevents the emitter of transistor 22 from acting as a collector since to do so it would have to become more negative than the base of transistor 22. Should the emitter tend to become more negative than the base, diode 17 would conduct and clamp the emitter at the base potential. Thus the bilateral switch comprising transistors 21 and 22 will not permit load device actuating current to flow when the oscillator is inactive. Due to the symmetry of the circuit, reversing the polarity of voltage source 25 would produce the same result.

Again assume that the negative terminal of the reversible source of D.C. voltage 25 is connected to terminal 26 of resistor 24 and that the oscillator becomes energized to cause current to flow through the base emitter circuits of transistors 21 and 22. In this case, the base electrode of transistor 21 will become negative relative to the emitter electrode and since the collector electrode is properly biased by D.C. source 25 relative to the emitter electrode, current flows from the emitter to the collector in the usual manner. The base electrode of transistor 22 is negative relative to the collector of this transistor and current will flow from the collector into the base within the forward-biased base-collector junction. The base electrode of transistor 22 is also negative with respect to the emitter and thus the emitter-base junction will also be forward-biased. The result is that transistor 22 operates as a closed bilateral switch in contrast with transistor 21, and its emitter-collector circuit will have virtually no impedance. Since the impedance of the emitter-collector circuit of transistor 21 is relatively small, because the transistor is biased to conduction, the low aggregate impedance of these transistors in the load circuit will cause a large current to flow through load device 24. When negative potential is removed from base electrode 4 of the oscillator control transistor 2, oscillator 1 ceases to produce an output, and transistors 21 and 22 revert back to their former states to cause the flow of operating current in the load circuit to cease.

In the event that the polarity of the source of D.C. voltage 25 is reversed so that the positive potential is applied to terminal 26 of resistor 24, transistor 21 will operate as a closed bilateral switch and transistor 22 will operate conventionally. Of course, the aggregate impedance of the emitter-collector circuit of the transistors will remain the same so that the same current flows through the load device to actuate it regardless of the polarity of the source of D.C. voltage 25. Thus, a bilateral switch is provided which comprises transistors 21 and 22 and which causes a large proportion of the voltage output of the relatively high voltage source 25 to be applied across the load device when a relatively low control voltage is applied to the base electrodes of the transistors. It should be noted that the polarity of voltage source 25 may be reversed at any time and yet the bilateral switch will apply a large proportion of the reversed voltage across the load device. In other electronic applications, source 25 could be an A.C. signal source having large voltage swings. This is in contrast with bilateral switches of the prior art which require the control voltage to be greater than the maximum voltage swings of signals passed by the switches.

Of course, it should be understood that NPN transistors may be utilized instead of PNP transistors if a positive control voltage is applied to the base electrodes to cause actuation of the load device.

The frequency of the blocking oscillator 1 was 20–40 kc. and under optimum conditions switching was accomplished within one cycle. Switching speed may be controlled somewhat by changing the size of the smoothing choke.

In the operative embodiment of the invention as disclosed in the figure, the following component values were utilized:

| | |
|---|---|
| Transistor 7 | 2N369. |
| Transistors 21, 22 | 2N45. |
| Capacitor 6 | .02$\mu$f. |
| Resistor 5 | 6.8K. |
| Resistor 8 | 220$\omega$. |
| Resistor 24 | 1K. |
| Resistor 15 | 22$\omega$. |
| Diodes 16, 17 | 1N305. |
| Choke 19 | 1 mh. |
| Voltage source 3 | −12 volts. |
| Voltage source 25 | ±50 volts. |
| Transformer 12 | Soft ferrite.<br>Toroid or cup core.<br>Input winding, 100 turns.<br>Feedback winding, 30 turns.<br>Output winding, 40 turns. |

Of course it should be understood that these values are given as examples only, and that the practice of the invention is not limited thereto.

While I have shown and described a specific embodiment of my invention, other modifications will readily occur to those skilled in the art. I do not therefore desire my invention to be limited to the specific arrangement shown and described and I intend in the appended claim to cover all modifications within the spirit and scope of my invention.

What is claimed is:

A bilateral switch for connecting a load to a source of load current comprising, a source of fluctuating voltage having a first and second output terminal, means for controlling the state of activation and de-activation of said source of fluctuating voltage, a unilateral conducting device coupled across said first and second output terminal, an inductor, means for coupling one electrode of said unilateral conducting device to one terminal of said inductor, a first and second translating device each having a pair of control electrodes and an output electrode, means for coupling the other terminal of said inductor to one of said pair of control electrodes of each translating device, means for coupling the other electrode of said unilateral conducting device to the other of said pair of control electrodes of each translating device, a load device having a first and second terminal, a source of operating voltage having a first and second terminal, means for coupling the second terminal of said load device to the second terminal of said source of operating voltage, means for coupling the first terminal of said source of operating voltage to the output electrode of one of said translating devices, and means for coupling the first terminal of said load device to the output electrode of the other of said translating devices.

References Cited in the file of this patent

UNITED STATES PATENTS

| | | |
|---|---|---|
| 2,668,911 | Schlesinger | Feb. 9, 1954 |
| 2,816,230 | Lindsay | Dec. 10, 1957 |
| 2,866,909 | Trousdale | Dec. 30, 1958 |
| 2,899,571 | Myers | Aug. 11, 1959 |